United States Patent
Wickramasuriya et al.

(10) Patent No.: US 10,423,987 B2
(45) Date of Patent: Sep. 24, 2019

(54) DYNAMIC GENERATION AND LAYOUT OF MEDIA ASSETS IN A CAMPAIGN MANAGEMENT SYSTEM

(71) Applicant: ARRIS Enterprises, Inc., Suwanee, GA (US)

(72) Inventors: Jehan Wickramasuriya, St. Charles, IL (US); Venugopal Vasudevan, Palatine, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 917 days.

(21) Appl. No.: 14/876,755

(22) Filed: Oct. 6, 2015

(65) Prior Publication Data

US 2017/0098254 A1    Apr. 6, 2017

(51) Int. Cl.
*G06Q 30/02* (2012.01)

(52) U.S. Cl.
CPC ..... *G06Q 30/0276* (2013.01); *G06Q 30/0277* (2013.01)

(58) Field of Classification Search
CPC .................................................... G06Q 30/02
USPC ........................................................ 725/34
See application file for complete search history.

(56) References Cited

U.S. PATENT DOCUMENTS

| | | | |
|---|---|---|---|
| 7,098,870 B2 | 8/2006 | Wampler et al. | |
| 7,770,109 B2 | 8/2010 | Fortes | |
| 2012/0239498 A1 | 9/2012 | Ramer et al. | |
| 2013/0006772 A1 | 1/2013 | Silverbrook et al. | |
| 2013/0263182 A1* | 10/2013 | Ivy | H04N 21/458 725/34 |
| 2015/0073921 A1 | 3/2015 | Vasudevan et al. | |
| 2015/0254732 A1 | 9/2015 | Snyder | |

FOREIGN PATENT DOCUMENTS

WO    2009007410 A3    1/2009

OTHER PUBLICATIONS

PCT Search Report, Re: Application No. PCT/US2016/055420, dated Nov. 29, 2016.

(Continued)

*Primary Examiner* — Marilyn G Macasiano
(74) *Attorney, Agent, or Firm* — Stewart M. Wiener (57) ABSTRACT

Particular embodiments take first screen media assets and can derive second screen appropriate media assets. Then, particular embodiments may determine a target application for the second screen media assets. Layout characteristics for the target application is determined. Particular embodiments correlate the layout characteristics and the second screen media assets to select a second screen media asset for the target application. The correlation may generate scores based on the second screen media assets and the layout characteristics to determine a best fit of a second screen media asset for the target application. Then, the second screen media asset may be transcoded based on the characteristics of the target application or target device. After transcoding, particular embodiments may create a view of the second screen media asset in the target application, such as an overlay of the second screen media asset over a screen capture of the target application.

20 Claims, 8 Drawing Sheets

(56) References Cited

OTHER PUBLICATIONS

Donato Malerba et al, "Correcting the Document Layout: A Machine Learning Approach", Proceedings of the Seventh International Conference on Document Analysis and Recognition (ICDAR 2003), Aug. 2003, pp. 1-6.
Official Action, Re: Canadian Application No. 3,000,845, dated Nov. 1, 2018.

* cited by examiner

DYNAMIC GENERATION AND LAYOUT OF MEDIA ASSETS IN A CAMPAIGN MANAGEMENT SYSTEM

BACKGROUND

Second screen solutions are growing at a rapid rate. The second screen solutions display second screen content on second screen devices while a user watches first screen content on a first screen device. For example, a user may watch a television show on a television and receive supplemental content on a mobile device. The second screen may be used to provide advertising that can supplement the first screen content being shown on the first screen device. For example, advertisers may diversify their investment in television advertising to reach more of their users that are consuming media on multiple different second screen devices.

While providing advertisements on multiple second screen devices is ideal, one limitation, especially for smaller local advertisers, is the cost of creating second screen advertisements. The cost of creating the first screen advertisement may already be high. Then, to create a second screen advertisement to run in conjunction with the first screen advertisement, the advertiser has to typically create a new second screen advertisement from scratch. This may not be feasible for the local advertisers who have a smaller budget to create advertisements. Further, creating the second screen advertisement may be more complicated and difficult than creating the first screen advertisement due to the many different types of second screen devices that can be used. Each different type of second screen device may have different specifications, such as different screen sizes, different resolutions, layout requirements, etc. This often results in advertisers deciding to not use second screen advertisements.

DETAILED DESCRIPTION

Described herein are techniques for a media asset creation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments take first screen media assets and can derive second screen appropriate media assets. The second screen media assets may be based on portions of the first screen media asset, such as screen captures, snippets of video, etc. Then, particular embodiments may determine a target application for the second screen media assets. Layout characteristics for the target application is determined. For example, particular embodiments analyze accessible information for the target application, such as layout files, or reverse engineer the target application using application package files. Also, screen captures of different views of the target application may be generated.

Then, particular embodiments correlate the layout characteristics and the second screen media assets to select a second screen media asset for the target application. The correlation may generate scores based on the second screen media assets and the layout characteristics to determine a best fit of a second screen media asset for the target application. Then, the second screen media asset may be transcoded based on the characteristics of the target application or target device. For example, the transcoding may be based on the screen resolution, device capabilities, and/or the layout of the target application. After transcoding, particular embodiments may create a view of the second screen media asset in the target application, such as an overlay of the second screen media asset over a screen capture of the target application. This allows a customer to review how the second screen media asset may look in the target application.

Overview

Figure 1:
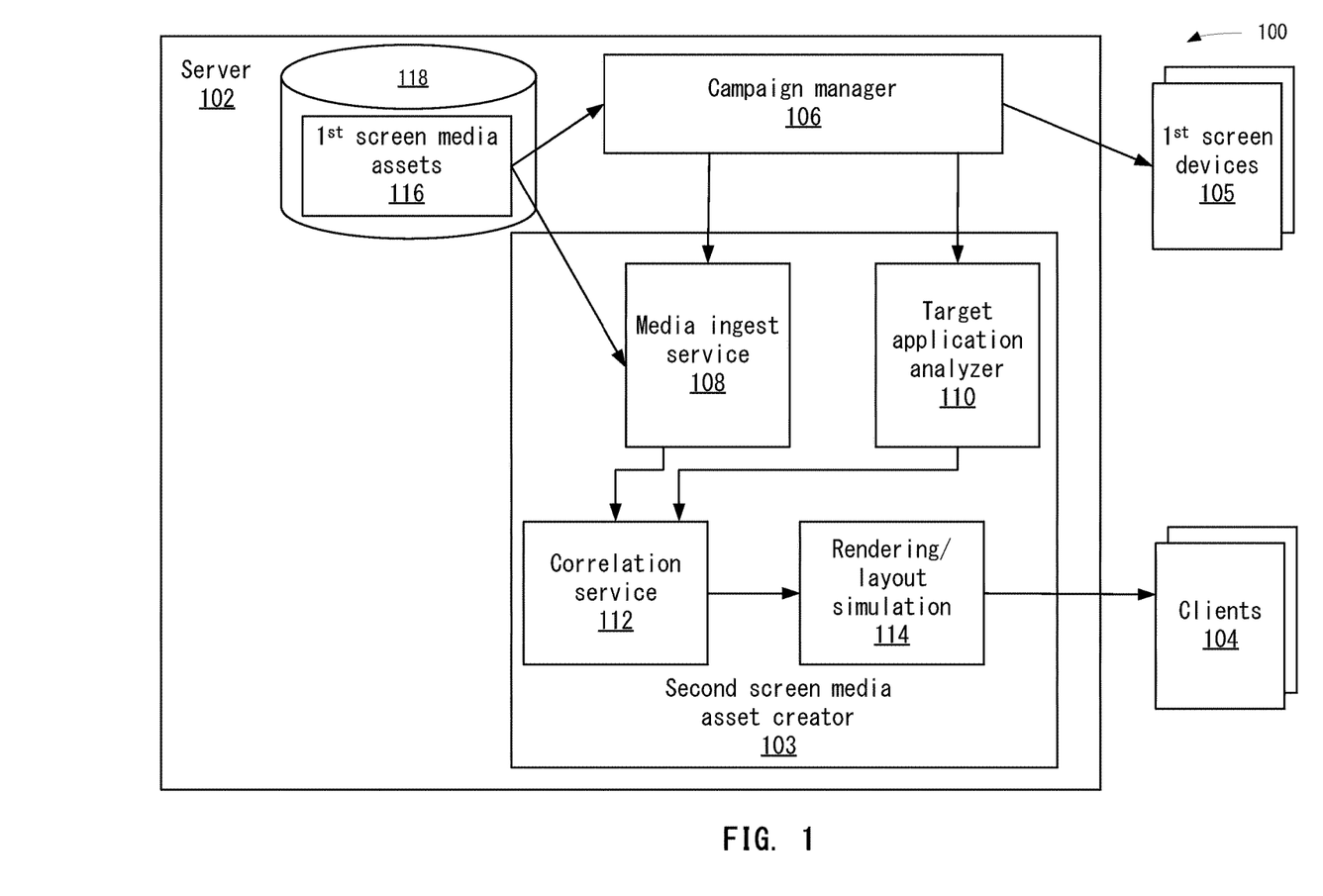
FIG. 1 depicts a system for generating second screen media assets on a target application according to one embodiment.

FIG. 1 depicts a system 100 for generating second screen media assets on a target application according to one embodiment. A server 102 includes a second screen media asset creator 103 and a campaign manager 106. Second screen media asset creator 103 may generate views of second screen media assets in target applications for viewing on clients 104 according to one embodiment. Second screen media asset creator 103 includes a media ingest service 108, a target application analyzer 110, a correlation service 112, and a rendering/layout simulator 114. It will be understood that the services may be distributed over multiple computing devices.

Campaign manager 106 organizes and delivers first screen media assets stored in storage 118 according to a campaign to clients 102. For example, campaign manager 106 may manage advertising campaigns for customers. In one embodiment, campaign manager 106 manages campaigns for first screen ($1^{st}$ screen) devices 105. A campaign may be a configured delivery of first screen media assets 116 to first screen devices 105. First screen media assets 116 may be advertisements that are played during commercial breaks, such as during a broadcast of a television show, or on demand. Also, first screen media assets 116 may be any video, such as the actual television show. In other embodiments, first screen media assets 116 may be static information, such as information in web pages or pictures.

First screen media assets 116 may be configured for display on first screen devices, such as televisions, or other computing devices. In one embodiment, these first screen media assets 116 may be designed for full screen display on a television and not for smaller devices, such as smartphones, tablets, or laptops. Typically, the first screen devices 105 are standardized in their display properties as compared to mobile devices, which may have different display resolutions, sizes, and layout properties. First screen media assets 116 may be stored in storage 118 and delivered to first screen devices (e.g., clients 102) per the requirements of the campaign.

As discussed above, some companies do not create second screen campaigns due to many factors, such as cost, time, or complexity. Particular embodiments may include second screen media asset creator 103 in server 102 to intercept or retrieve first screen media assets 116. Further, second screen media asset creator 103 may retrieve campaign logic from campaign manager 106 for the campaign. Then, second screen media asset creator 103 can determine when a second screen campaign may be feasible. For example, when second screen assets can be derived from first screen media assets 116 and inserted into a target application, then it may be possible to generate a second screen campaign. Second screen media asset creator 103 may generate a view of the second screen campaign and output it to the customer. By generating these views, second screen media asset creator 103 may overcome the problem of companies not attempting to create second screen campaigns. Further, using the views, second screen media asset creator 103 may also be able to automatically start using the second screen campaign using campaign manager 106.

Media ingest service 108 may generate second screen media assets from first screen media assets 116. Second screen media assets may also be advertisements, but may be any type of content. In one embodiment, media ingest service 108 may create derivative second screen media assets from first screen media asset 116. The derivative second screen media assets may be generated by analyzing characteristics of first screen media assets 116. Examples of the analysis may include analyzing visual elements, call-to-action (CTA) data elements, and possibly additional metadata concerning the subject matter or branding message of first screen media asset 116. A variety of second screen media assets may be generated from a single first screen media asset 116. An example of a media ingest service 108 may be found in related U.S. patent application Ser. No. 14/482,368, entitled "Creating Derivative Advertisements", filed Sep. 10, 2014, which claims priority to Provisional Application No. 61/875,693, filed Sep. 10, 2013, which is incorporated by reference for all purposes.

Media ingest service 108 may create the second screen media assets based on campaign logic from campaign manager 106. For example, some customers may want to create second screen media assets for certain types of devices or certain types of target applications. In one example, the campaign may specify that a second screen campaign for tablet devices is desired.

Target application analyzer 110 may also analyze a target application or multiple target applications that can be used to display the second screen media assets. The target application may be a software application that can run on a target device, such as a native application or a website. The target application could also encompass a device platform, such as tablet devices, a type of mobile device, etc. In this case, the target application may be a device operating system.

Target application analyzer 110 may also determine the target application based on information from campaign manager 106. For example, a campaign may define which target applications should be analyzed, such as via a link to the target application. Also, target application analyzer 110 may determine the target applications based on characteristics from first screen media assets 116. For example, based on the analysis of first screen media assets 116 or second screen media assets, target application analyzer 110 may determine the best target applications that can fit the second screen media assets.

Target application analyzer 110 may then determine layout characteristics for the target application. The layout characteristics may be determined automatically based on the target application, such as from accessible files for the target application. The accessible files may not include the target application source code, which typically are not be accessible. However, certain files that are needed for a computer to display pages for the target application are accessible and can be analyzed. In one embodiment, tags in the files for the target application may be used to determine where ad placements are allowed. For example, banner ads and other areas where advertisement are displayed are determined from the software code in the accessible files. Also, target application analyzer 110 may obtain screen captures of each unique application screen or view. The screen captures may be used to formulate a view of the second screen media assets in the target application.

Correlation service 112 may then correlate second screen media assets received from media ingest service 108 with the layout characteristics determined from target application analyzer 110. The correlation may filter second screen media assets to determine at least one second screen media asset that can be feasibly rendered within the layout obtained for the target application. Further, correlation service 112 may determine the second screen media asset based on campaign logic for the first screen media asset. For example, the campaign logic may include some device constraints, such as the advertisement may need to be a certain size or provided on a certain type of device. Once the second screen media asset is selected and correlated to a layout of the target application, correlation service 112 passes the correlation information to a rendering/layout simulator 114. The correlation information may include the selected second screen media asset, the layout position, and device requirements.

Rendering/layout simulator 114 may then generate of view of the second screen media asset in the target application. For example, rendering/layout simulator 114 may overlay the second screen media asset within the target application. However, the second screen media asset is derived from the first screen media asset 116 and may not be in a format compatible with the device requirements or target application. In this case, rendering/layout simulator 114 may transcode the second screen media asset into a format compatible with the target application and target device requirements. The transcoder may modify the second screen media asset based on the end device characteristics for the target application, such as screen resolution, device capabilities, the layout, and customer requirements from the ad campaign. Then, rendering/layout simulator 114 may overlay the second screen media asset within the application, such as overlaying the second screen media asset in the screen captures. This will generate a simulated view of the second screen asset within the target application. Rendering/layout simulator 114 may then provide the simulated view to a client 104.

A customer may review the view and determine whether or not the second screen media asset in the target application is acceptable or not. In one example, if acceptable, second screen media asset creator 103 can generate a second screen campaign automatically, and add the second screen campaign to ad campaign manager 106 for delivery to second screen devices. For example, second screen media asset creator 103 can use the layout files for the target application to allow the second screen media asset to be displayed in the target application.

Target Application Analysis

Figure 2:
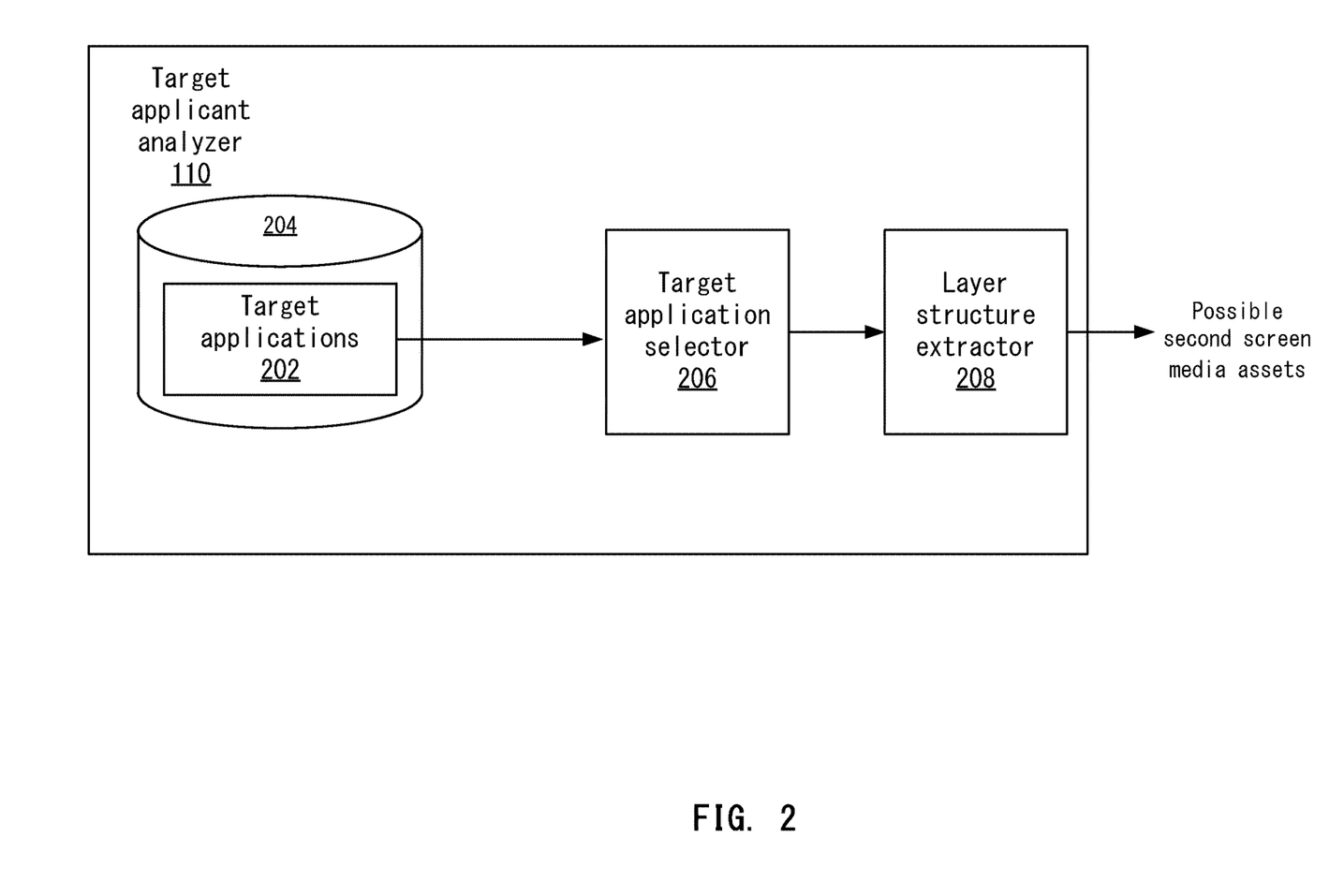
FIG. 2 depicts a more detailed example of a target application analyzer according to one embodiment.

FIG. 2 depicts a more detailed example of target application analyzer 110 according to one embodiment. Target applications 202 may be stored in storage 204. In other embodiments, target applications 202 may be accessed through the Internet. For example, these target applications are live web pages. Target applications 202 may be a library of possible target applications in which second screen media assets may be displayed.

A target application selector 206 may select some of the target applications 202. For example, target application selector 206 may receive campaign logic for the campaign that specifies customer requirements, such as which devices or target applications 202 are desired for the second screen ad campaign. The selected target applications 202 may be identified by a link (e.g., uniform resource locator) or identifier.

Target application selector 206 may then analyze target applications 202 to select a target application. Although one target application 202 is discussed, multiple target applications may be selected. In one example, target application selector 206 may select a mobile device application as target application 202 based on the campaign logic.

Once the target application 202 is selected, a layout structure extractor 208 may analyze target application 202 to extract files that include the layout. These accessible files may not include the source code for target application 202. Typically, the source code for target application 202 is accessible only to the developer of the target application. Layout structure extractor 208 uses other files that are accessible to other parties in this case.

Target application 202 may be different kinds of applications, such as native applications or web-based. Native applications are installed on the target device and web-based applications are accessed through a browser and data connection.

The analysis of the layout may include reverse engineering target application 202, loading a resource table and decoding a manifest file, and/or using file resources and other files, such as extensible markup language (XML) files or hypertext transfer markup language (HTML), pertaining to the layout. Layout structure extractor 208 may analyze a native application using files for the native application that are accessible. The analysis may be performed using a variety of tools that analyze accessible files for target application 202. Reverse engineering the application may involve analyzing a software package that is distributed and used to install the target application. In one embodiment, an Android™ application package (.apk) may be analyzed for target application 202.

Layout structure extractor 208 may also load the resource table and decode the manifest file. A resource table is generated as part of the creation of an Android executable (.apk) and includes the layout XML, manifest, resources (drawables, strings, icons) and an application package resource file (.arsc file). The manifest file may include essential information for target application 202 that is used to run target application 202. The manifest file in Android describes the components of the application, including activities that can be useful (together with other information) in inferring layout and components. It also provides other information like minimum application programming interface (API) level; linked libraries and permissions that can all be used to determine what media assets can be matched.

The file resources and XML files pertaining to the layout may provide layout information that is used to lay out entities in target application 202. For example, the files may include tags or other descriptors where advertisements are included. Layout structure extractor 208 may use the tags to determine how entities within target application 202 are laid out. This may provide structure as to where potential second screen media assets may be placed.

For a target application 202 that is displayed as a website, software code used to display the webpages for the site may be analyzed, such as HTML code, or cascading style sheets (CSS) code. This code may describe the look and formatting of the target application 202, and is accessible to layout structure extractor 208 because it is needed to display the webpage.

In one embodiment, layout structure extractor 208 may search for existing advertising layout space in the software code. This may include common search patterns, such as @id/ad symbols or other similar symbols. Layout structure extractor 208 may use the space defined by the symbols as potential second screen media asset space because this space is already being used for advertisements.

Layout structure extractor 208 may also analyze target application 202 for other potential second screen media asset space within the layout. For example, layout structure extractor 208 may use templates to search for banner space at the top or bottom of the page or large areas being used for image data, such as ImageViews in an Android™ operating system or <img> tags on a website. Layout structure extractor 208 may then output the possible second screen media asset space for target application 202.

Layout structure extractor 208 may also perform screen captures for target application 202. This may provide different views of target application 202, which may be used to insert overlays of the second screen media asset later.

Cross Correlation

Particular embodiments may cross-correlate between second screen media assets, device parameters from the campaign, and the layout parameters. The cross correlation may provide a filtered list of second screen media assets that can be fit against the layout space.

Figure 3:
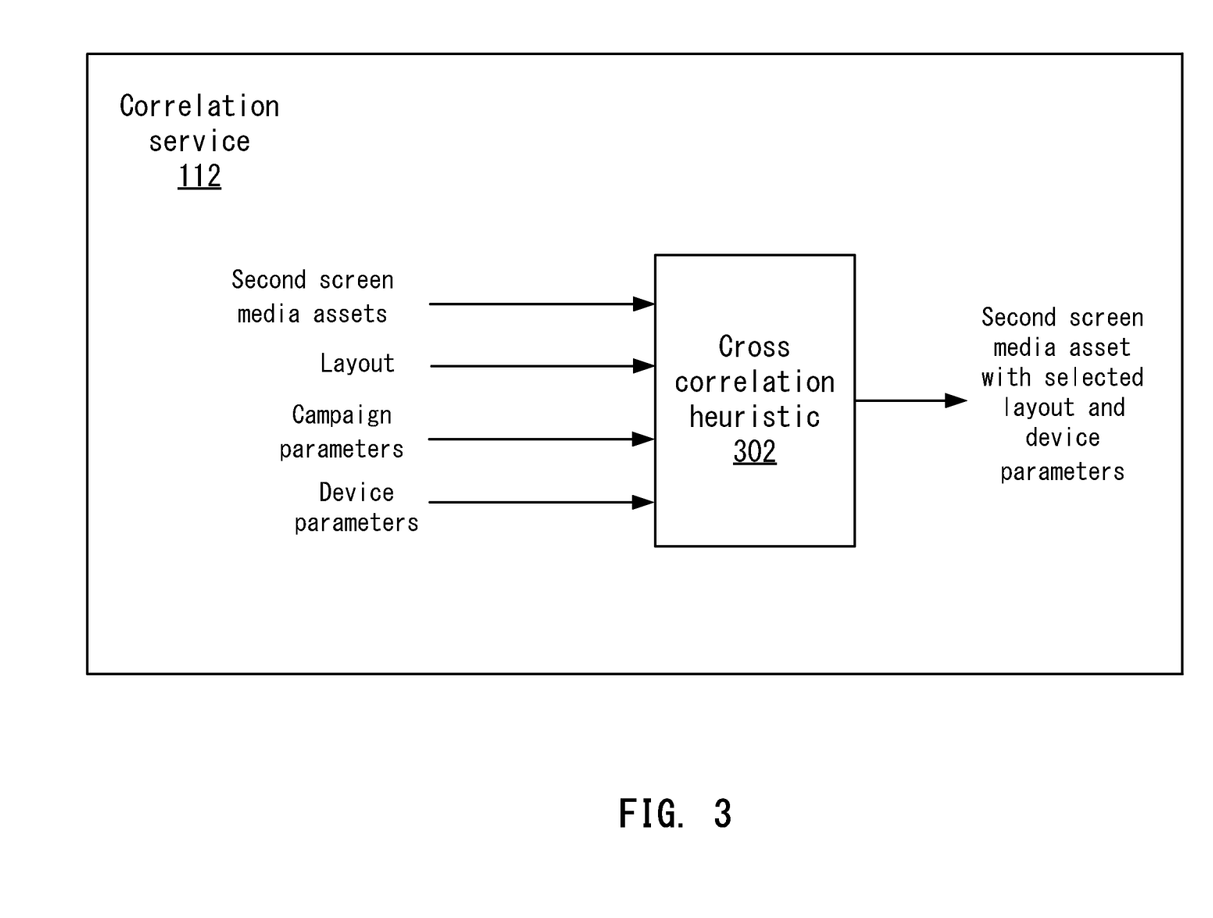
FIG. 3 depicts a more detailed example of a correlation service according to one embodiment.

FIG. 3 depicts a more detailed example of correlation service 112 according to one embodiment. A cross correlation heuristic 302 is used to determine a filtered list of second screen media assets, a layout, campaign parameters, and/or device parameters. In one embodiment, multiple second screen media assets from media ingest service 108, the layout parameters from layout structure extractor 208 regarding possible layout space, and target device parameters and campaign parameters from campaign manager 106 are input into cross correlation heuristic 302. Cross correlation heuristic 302 may analyze multiple combinations of the inputs to determine a filtered list of second screen media assets, a selected layout, and the device parameters. The heuristic may be rank the different combinations based on an algorithm. The heuristics may be implemented using matching techniques between media assets and layouts. Other solutions may also be appreciated. For example, machine learning algorithms can receive an input of media assets and layouts and select media assets for a specific layout. However, in terms of a more robust and broad solution one could certainly use machine learning classification to assist in layout. For example, a global/local analysis and inductive learning can be used. The heuristic may be trained based a number of common application layouts and the machine learning algorithm may be able to classify media assets for different optimal layouts. This could provide a starting point of how to visualize how the second-screen assets can be fit within an application, and then users can alter the layout as desired.

In one example, cross correlation heuristic 302 may generate scores for different combinations of the second screen media assets, layout parameters, campaign parameters, and target device parameters to determine a best fit. Cross correlation between the derived second screen media assets and the campaign parameters may affect the selection of second screen media type (e.g., video or image) and also the device parameters (e.g., maximum capable resolution, orientation, format, etc.). Also, outside of layout files, there may be other parameters associated with the campaign that can be used to generate matches between the derived second screen media assets and that target application. For example, the target application may indicate it has digital billboard space (with accompanying parameters for size etc.) which can be candidate real estate for utilizing some of the derived second screen media assets.

Also, first-screen campaign data may provide intelligent suggestions or a simulated view of the target application. Previously known data on program/series/genre can suggest a type of ad, specific classes of ads, click-through actions, or a multiplicity of layout options for a single first-screen media asset. The campaign parameters may also include elasticity (e.g., a window of time in which the second screen media asset can be placed). This time can be used to dynamically determine when to overlay a second screen media asset in the target application. The layout can be dynamically impacted by interruptability/attention, and this can be simulated. The variability can now depend not only on the attributes of the first screen media asset but also attributes of the target device (or an aggregated set of attributes across target devices).

An example of the output would be a selected second screen media asset, a layout position in target application 202, and the device parameters for a device that would display the second screen media asset in the layout. The layout position may be in a portion of target application 202, or may be a full screen view.

Rendering/Layout View Generation

Figure 4:
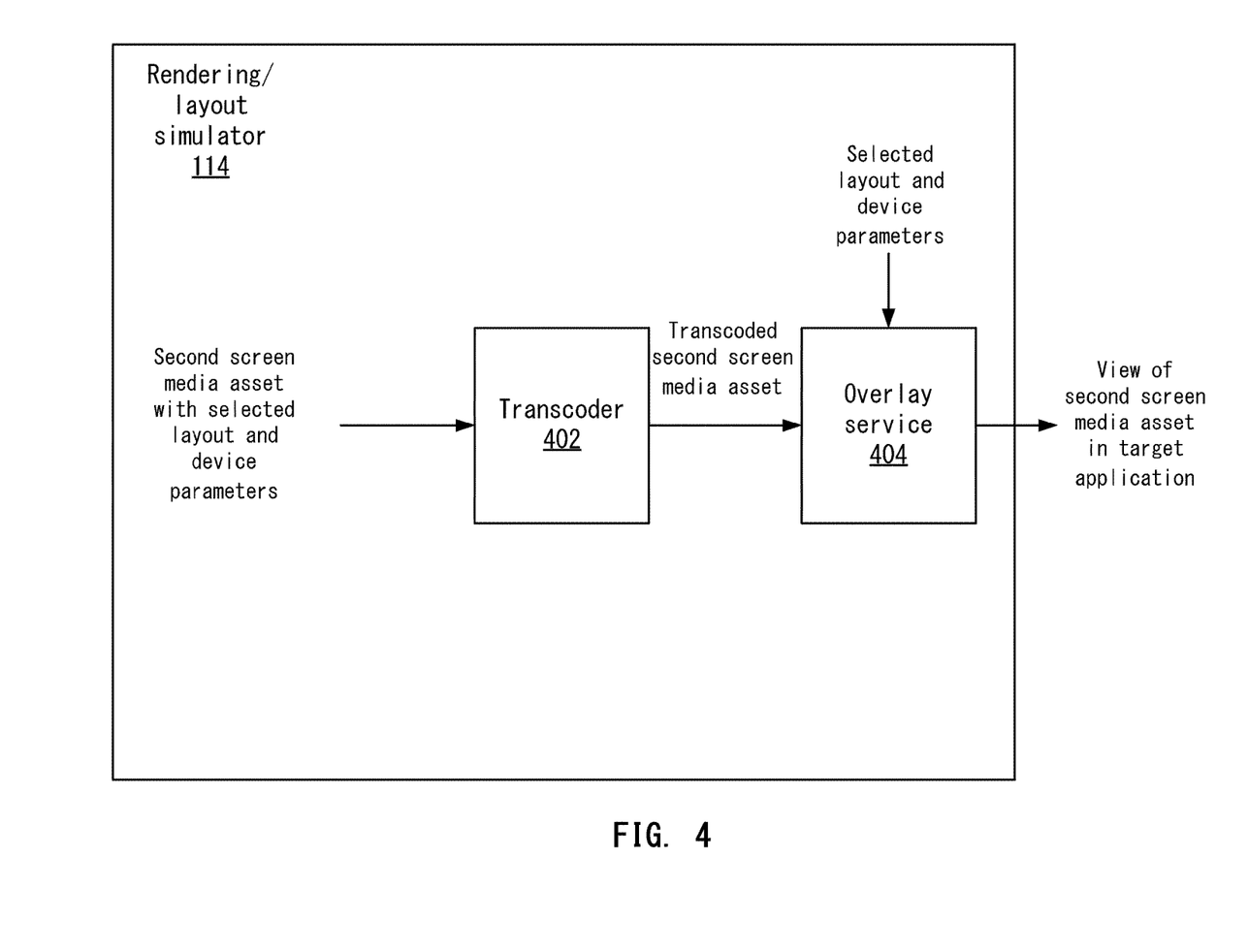
FIG. 4 depicts a more detailed embodiment of a rendering/layout simulator according to one embodiment.

Once the cross correlation is performed, rendering/layout simulator 114 may generate a view of the second screen media asset in target application 202. Before generating the layout, rendering/layout simulator 114 may have to transcode second screen media assets. This is because the second screen media asset that has been derived from the first screen media asset and may not be in a format compatible with a target device may have different parameters for displaying target application 202.

FIG. 4 depicts a more detailed embodiment of rendering/layout simulator 114 according to one embodiment. Although transcoding is described, it may not be performed. A transcoder 402 receives the selected second screen media assets, selected layout, and selected device parameters. Transcoder 402 is then configured to transcode/transform the second screen media asset based on the layout and device parameters. The transcoding may convert the second screen media asset to a different format. For example, transcoder 402 may transcode the second screen media asset to a different resolution based on the screen resolution of the target device. Also, transcoder 402 may transcode the second screen media asset based on the orientation (e.g., portrait or landscape) determined from the layout characteristics. Transcoder 402 may be specialized to operate dynamically on different device parameters and layouts depending on what parameters were determined by correlation service 112. In this case, transcoder 402 may be programmable based on what parameters are output by correlation service 112.

An overlay service 404 receives the transcoded second screen media asset and can overlay the second screen media asset in the target application at the appropriate position. For example, if a screen capture was performed, overlay service 404 overlays the second screen media asset at a position in the screen capture. Overlay service 404 can also insert the second screen media asset into target application 202. For example, the insertion of the second screen media asset is simulated in a live target application. Overlay service 404 may then output the view of the screen capture with the second screen media asset overlaid. It should be noted that multiple second screen media assets may be overlaid within the target application, such as in a single screen capture or multiple screen captures.

Overlay service 404 may also add contextual effects to the view. For example, the context of the device state may be used to adjust the view. In one embodiment, when the device is placed in landscape mode, target application 202 may change to a landscape view. To showcase this state, overlay service 404 may generate a view that is scaled appropriately for the landscape mode. Also, when a light level is low and can be detected using a light sensor on the device, overlay service 404 may increase the font size for the text for a view.

View Example

Figure 5:
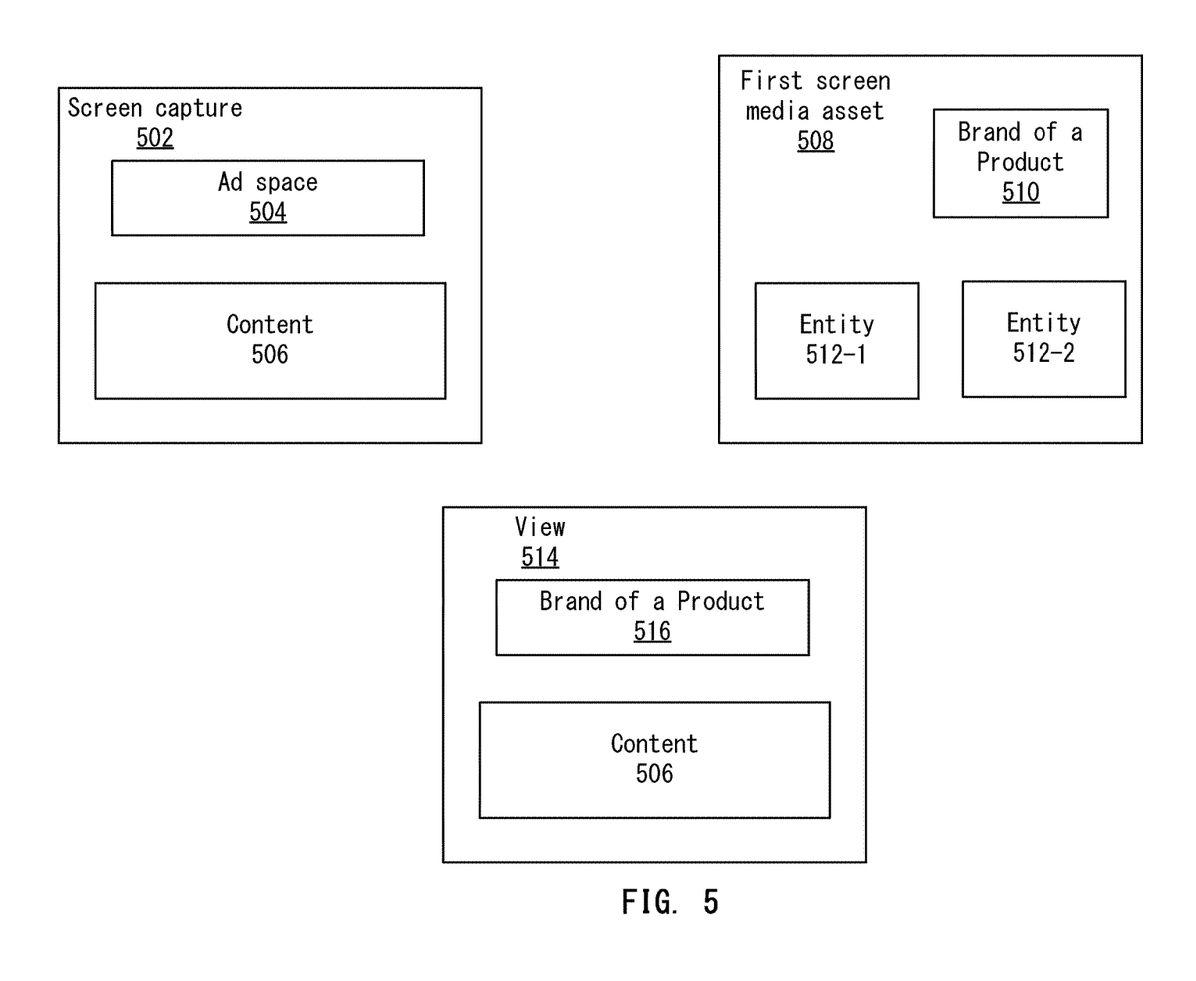
FIG. 5 depicts an example of creating a view according to one embodiment.

FIG. 5 depicts an example of creating a view according to one embodiment. At 502, a screen capture is shown of a target application 202. The screen capture includes ad space at 504 and also application content at 506. Target application analyzer 110 may determine the coordinates for ad space 504. This may be based upon an analysis of target application files as described above.

At 508, a first screen media asset is shown. In the media asset, a brand of a product is shown at 510. Also, other entities are shown at 512-1 and 512-2. This may be other people or things in the first screen media asset. Media ingest service 108 may identify the brand of the product at 510 as being suitable for a second screen media as set.

Correlation service 112 may then correlate the product as being appropriate to insert in the ad space. Once a correlation occurs, rendering/layout simulator 114 may generate a view 514 that overlays the product in the ad space. As shown, the product has been inserted at 516 into view 514. The product may have been transcoded into a different format, such as the orientation was changed to a landscape view to be compatible with the ad space layout. The content that was originally shown in the target application is still shown at 506. Accordingly, particular embodiments have taken a first screen media asset, created a second screen media asset, and inserted that second screen media asset into a target application 202. While this may be a simple example of the process, providing the view at 514 gives a customer a preview of how a second screen media asset may look in a target application. The customer may provide feedback as to the acceptability of the view, or any changes. Further, the view shown can have a real-time impact on the ad campaign and can be subsequently displayed by campaign manager 106 once it is approved.

Method Flow

Figure 6:
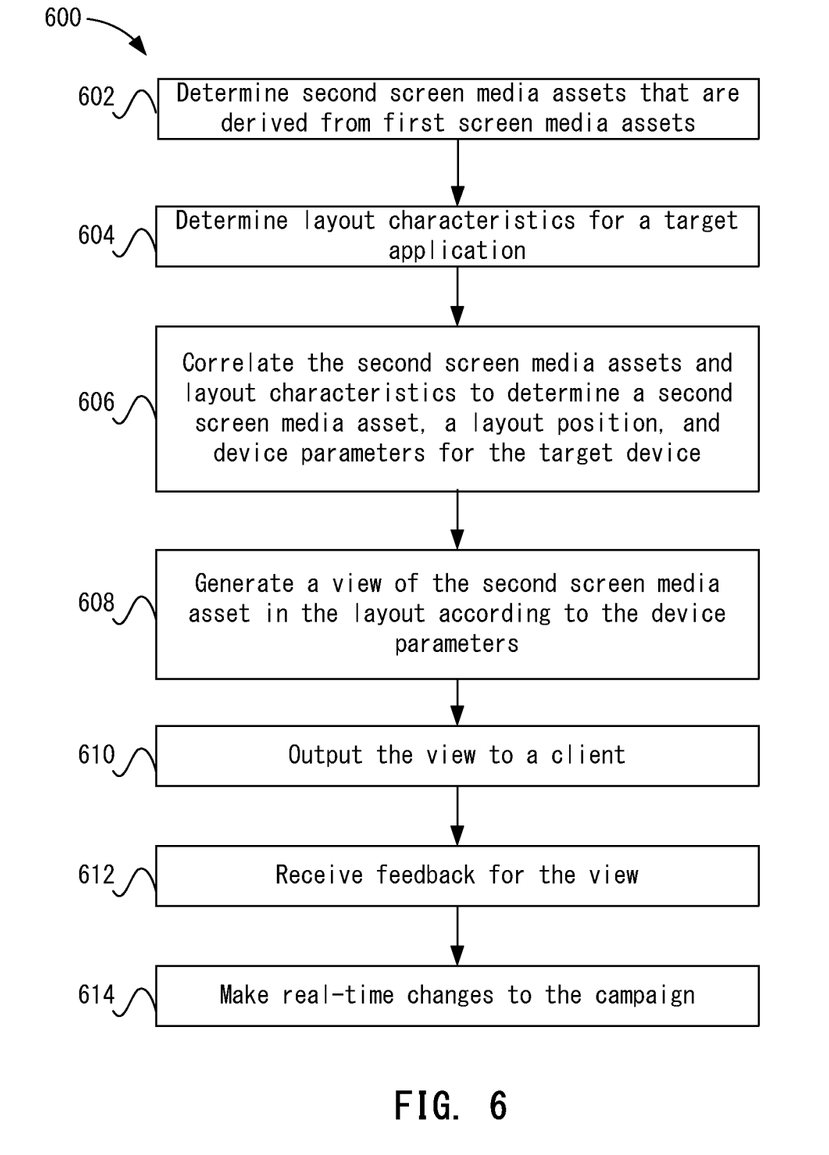
FIG. 6 depicts a simplified flowchart of a method for providing views of second screen media assets in target applications according to one embodiment.

FIG. 6 depicts a simplified flowchart 600 of a method for providing views of second screen media assets in target applications according to one embodiment. At 602, media ingest service 108 determines second screen media assets that are derived from first screen media assets. The second screen media assets may be generated based on analyzing the first screen media assets.

At 604, target application analyzer 110 determines a layout characteristics for a target application 202. Then, at 606, correlation service 112 correlates the second screen media assets and layout characteristics to determine a second screen media asset, a layout position, and device parameters for the target device.

At 608, rendering/layout simulator 114 generates a view of the second screen media asset in the layout according to the device parameters. At 610, rendering/layout simulator 114 then outputs the view to a client 104.

At 612, campaign manager 106 receives feedback for the view. For example, the feedback may indicate changes to the view and/or approval of the view. At 614, second screen media asset creator 103 may make real-time changes to the campaign. For example, second screen media asset creator 103 may initiate a second screen ad campaign using the view.

Real-Time Coordination with Campaign Manager 106

Figure 7:
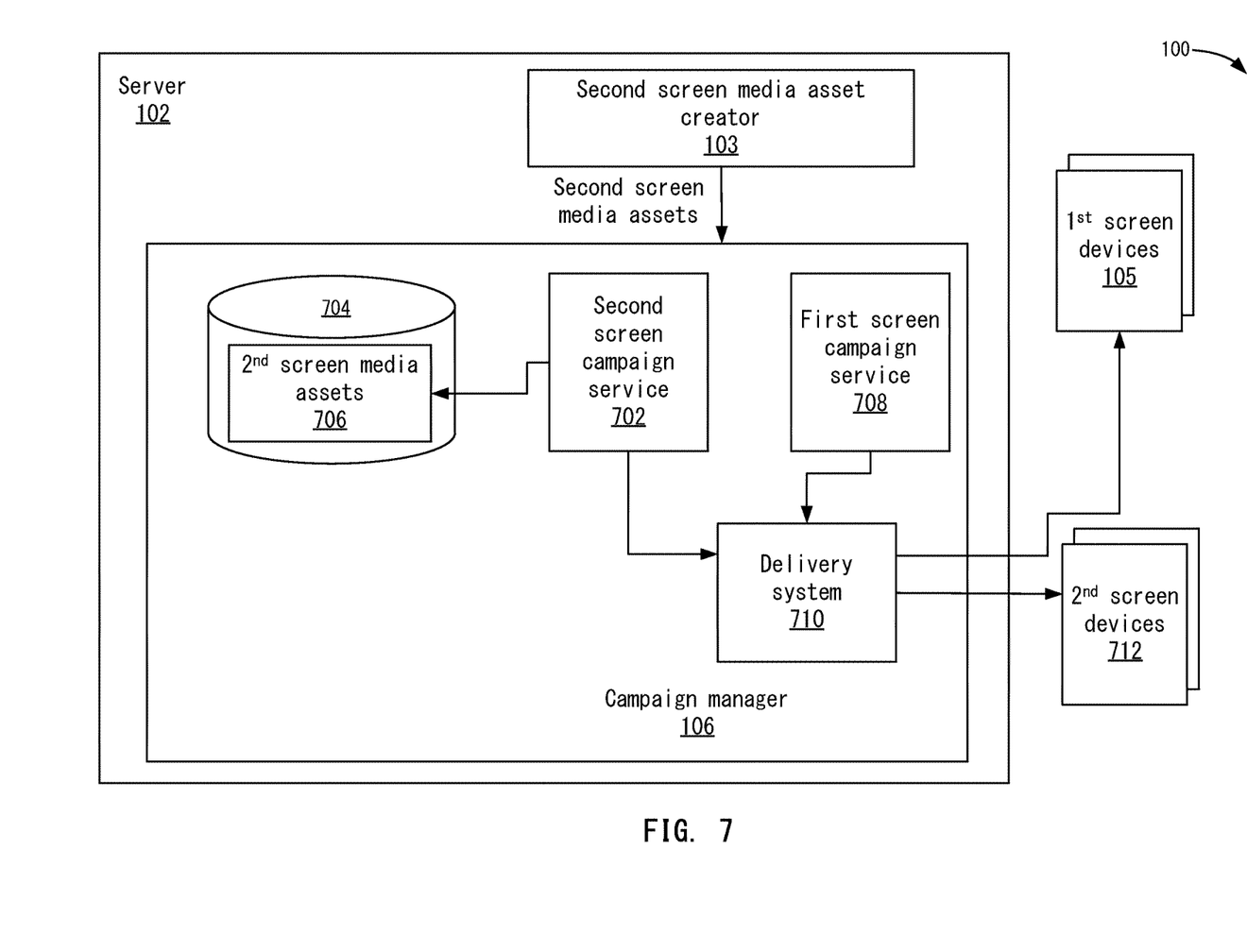
FIG. 7 depicts an example of implementing real-time changes to a campaign in a campaign manager according to one embodiment.

FIG. 7 depicts an example of implementing real-time changes to a campaign in campaign manager 106 according to one embodiment. Second screen media asset creator 103 creates views of second screen media assets as described above, and can receive confirmation of which second screen media assets should be added to a campaign. Second screen media asset creator 103 can then send the second screen media assets to campaign manager 106 with metadata on how to add the second screen media assets to the campaign.

A second screen campaign service 702 receives the second screen media assets and metadata and stores the second screen media assets at 706 in storage 704. Also, second screen campaign service 702 processes the metadata to add the second screen media assets to the campaign. The metadata may be based on the layout files that were determined during the view creation process. By knowing the layout and how the target application displays entities, second screen campaign service 702 can integrate the second screen media assets into the target application. The integration may provide an overlay in real-time via a tool or simulator to show the changes. Other platforms such as web-pages can be modified in real-time to display the second screen media assets in the layout.

Campaign manager 106 also includes a first screen campaign service 708 that manages the first screen campaign. A delivery system 710 is used to deliver both the first screen media assets to first screen devices 105 and the second screen media assets to second screen devices 712. For example, first screen campaign service 708 may cause first screen media assets to be delivered to a first screen device 105. When an event occurs in the first screen media assets, second screen campaign service 702 causes delivery system 710 to deliver a second screen media asset to a second screen devices 702.

Integrating second screen media asset creator 103 improves the performance of campaign manager 106. The integration can automatically create second screen media assets and then add them to a campaign. Because the second screen media assets have been formatted for second screen delivery, delivery system 710 can automatically delivery them to second screen devices. Also, a feedback for the second screen media assets may be received indicating whether or not the layout was considered good or not.

Accordingly, a customer may have a second screen ad campaign automatically generated based on a first screen ad campaign. By using the service, customers may be able to preview what a second screen ad campaign may look like in a target application. Further, the customer does not need to employ outside services to generate the second screen advertisement. Rather, the view can be created automatically. Then, the seconds screen media advertisement can be automatically integrated into the campaign.

Computing System Example

Figure 8:
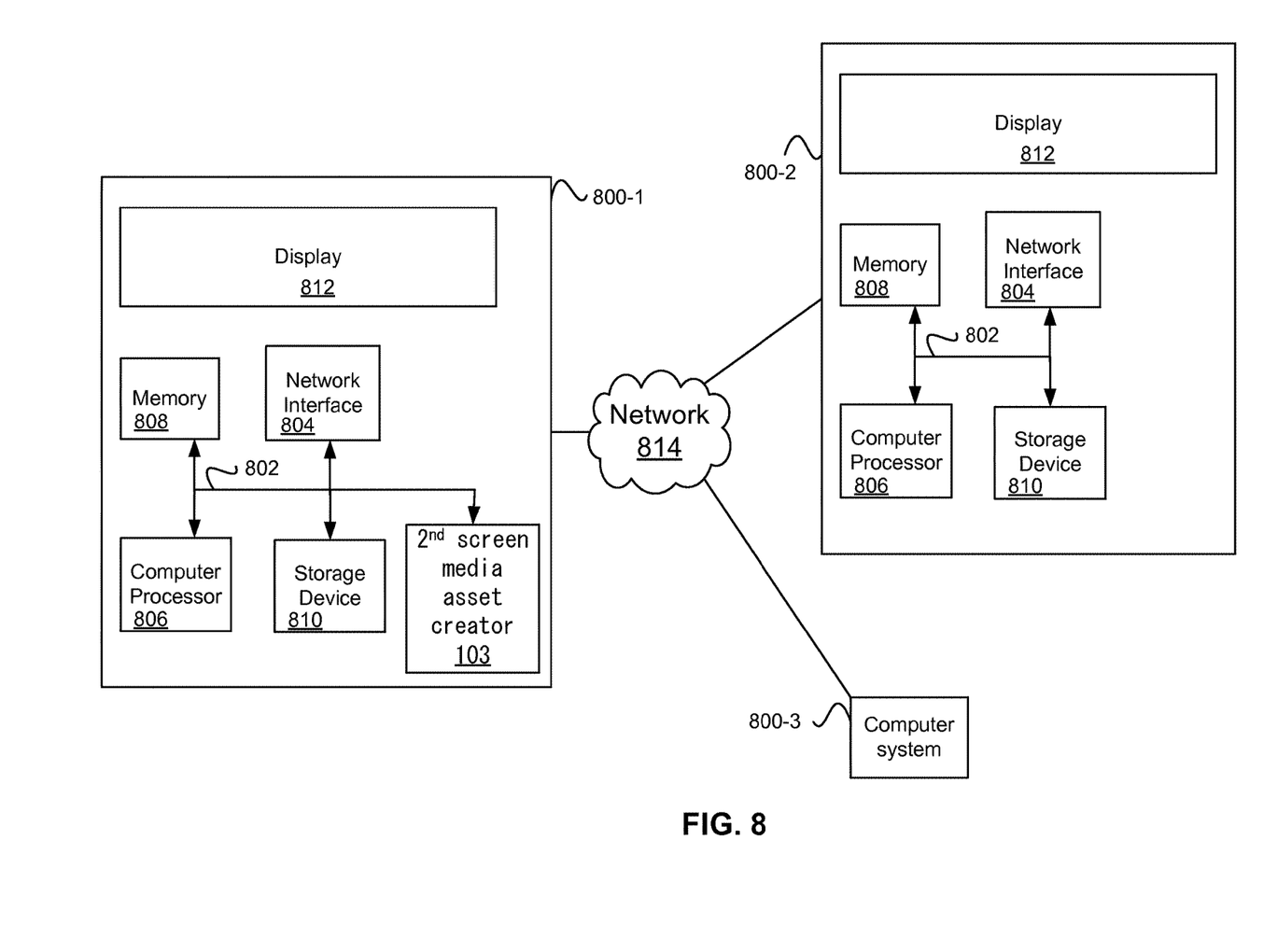
FIG. 8 illustrates an example of a special purpose computer system configured with a second screen media asset creator according to one embodiment.

FIG. 8 illustrates an example of a special purpose computer systems 800-1-800-3 with computer system 800-1 configured with second screen media asset creator 103 according to one embodiment. In one embodiment, computer system 800-1 describes server 102. Also, computer system 800-2 describes first-screen devices 105 or second-screen devices 812. Only one instance of computer system 800 will be described for discussion purposes, but it will be recognized that computer system 800 may be implemented for other entities described above, such as campaign manager 106.

Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by particular embodiments. The instructions, when executed by one or more computer processors 806, may be configured to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device different from a first screen device, a set of second screen media assets derived from a first screen media asset that is being contemporaneously delivered to the first screen device for display to a user of the first screen device, based on a campaign;
   selecting, by the computing device, a target application for the set of second screen media assets, the target application being configured to execute on a second screen device different from the first screen device and different from the computing device, for display on the second screen device to the user of the first screen device, wherein the user of the first screen device is contemporaneously a user of the second screen device;
   analyzing, by the computing device, a layout file of software code for the target application to determine layout characteristics for the target application;
   correlating, by the computing device, the layout characteristics and the set of second screen media assets to select a second screen media asset in the set of second screen media assets for a layout position in the target application;
   transforming, by the computing device, the second screen media asset into a format compatible with the target application; and
   generating, by the computing device, a view showing a placement of the second screen media asset in the layout position in the target application.

2. The method of claim 1, wherein analyzing the layout file for the target application comprises:
   analyzing the software code in the layout file to determine areas in the target application where the second screen media asset is insertable.

3. The method of claim 2, wherein the software code includes ad placement tags indicating where an advertisement is insertable.

4. The method of claim 2, wherein the software code includes a resource table that includes the layout file and manifest file describing entities of the target application that are used to determine the layout characteristics.

5. The method of claim 2, wherein the software code includes a markup language that identifies a layout of entities in the target application.

6. The method of claim 1, wherein the layout file includes a target application package that is used to reverse engineer the target application to determine where the second screen media asset is insertable.

7. The method of claim 1, wherein selecting the target application for the second screen media asset comprises using a campaign parameter for the first screen media asset to select the target application.

8. The method of claim 7, wherein the campaign parameter comprises a link to the target application.

9. The method of claim 7, wherein the campaign parameter is used to determine that the second screen media asset is compatible with the target application.

10. The method of claim 1, wherein correlating the layout characteristics and the set of second screen media assets comprises:
    ranking the set of second screen media assets.

11. The method of claim 10, wherein ranking comprises:
    using the set of second screen media assets, the layout characteristics, a campaign parameter, and a second screen device parameter to rank the set of second screen media assets.

12. The method of claim 11, further comprising:
    outputting the second screen media asset with the layout position, and the second screen device parameter.

13. The method of claim 1, further comprising:
    outputting the view to a client device for review; and receiving feedback for the view.

14. The method of claim 13, further comprising:
    upon receiving the feedback, automatically integrating the second screen media asset into the campaign for delivery to second screen devices when the feedback indicates the view is acceptable.

15. The method of claim 14, wherein the second screen media asset is integrated into the campaign by generating metadata using the layout characteristics, the metadata used to display the second screen media asset in the target application on the second screen device.

16. A non-transitory computer-readable storage medium containing instructions that, when executed, control a computer system to be configured for:
    receiving by the computer system, wherein the computer system is different from a first screen device, a set of second screen media assets derived from a first screen media asset that is being contemporaneously delivered to the first screen device for display to a user of the first screen device, based on a campaign;
    selecting a target application for the set of second screen media assets, the target application being configured to execute on a second screen device different from the first screen device and different from the computer system, for display on the second screen device to the user of the first screen device, wherein the user of the first screen device is contemporaneously a user of the second screen device;

analyzing a layout file of software code for the target application to determine layout characteristics for the target application;

correlating the layout characteristics and the set of second screen media assets to select a second screen media asset in the set of second screen media assets for a layout position in the target application;

transforming the second screen media asset into a format compatible with the target application; and generating a view showing a placement of the second screen media asset in the layout position in the target application.

17. The non-transitory computer-readable storage medium of claim 16, wherein analyzing the layout file for the target application comprises:

analyzing the software code in the layout file to determine areas in the target application where the second screen media asset is insertable.

18. The non-transitory computer-readable storage medium of claim 16, wherein selecting the target application for the second screen media asset comprises using a campaign parameter for the first screen media asset to select the target application.

19. The non-transitory computer-readable storage medium of claim 16, wherein correlating the layout characteristics and the set of second screen media assets comprises ranking the set of second screen media assets.

20. An apparatus comprising:

a second screen media asset creator comprising:
one or more computer processors; and
a non-transitory computer-readable storage medium comprising instructions that, when executed, control the one or more computer processors to be configured for:

receiving by the second screen media asset creator, wherein the second screen media asset creator is different from a first screen device, a set of second screen media assets derived from a first screen media asset that is being contemporaneously delivered to the first screen device for display to a user of the first screen device, based on a campaign;

selecting a target application for the set of second screen media assets, the target application being configured to execute on a second screen device different from the first screen device and different from the second screen media asset creator, for display on the second screen device to the user of the first screen device, wherein the user of the first screen device is contemporaneously a user of the second screen device;

analyzing a layout file of software code for the target application to determine layout characteristics for the target application;

correlating the layout characteristics and the set of second screen media assets to select a second screen media asset in the set of second screen media assets for a layout position in the target application;

wherein the one or more computer processors are further configured to be communicatively coupled to a transcoder configured to transform the second screen media asset into a format compatible with the target application, and wherein the one or more computer processors are further configured to be communicatively coupled to a renderer configured to generate a view showing a placement of the second screen media asset in the layout position in the target application.

* * * * *